(12) United States Patent
Gitt

(10) Patent No.: US 7,914,412 B2
(45) Date of Patent: Mar. 29, 2011

(54) LOAD-SHIFTABLE TRANSMISSION FOR A COMMERCIAL VEHICLE

(75) Inventor: Carsten Gitt, Stuttgart (DE)

(73) Assignee: Daimler AG, Stuttgart (DE)

( * ) Notice: Subject to any disclaimer, the term of this patent is extended or adjusted under 35 U.S.C. 154(b) by 368 days.

(21) Appl. No.: 12/286,437

(22) Filed: Sep. 29, 2008

(65) Prior Publication Data

US 2009/0095101 A1    Apr. 16, 2009

Related U.S. Application Data

(63) Continuation-in-part of application No. PCT/EP2007/002744, filed on Mar. 28, 2007.

(30) Foreign Application Priority Data

Apr. 4, 2006    (DE) .......................... 10 2006 015 661

(51) Int. Cl.
*F16H 37/02* (2006.01)
*F16H 3/02* (2006.01)

(52) U.S. Cl. .......................................... 475/207; 74/745

(58) Field of Classification Search ............... 74/330, 74/331, 745; 475/207, 209

See application file for complete search history.

(56) References Cited

U.S. PATENT DOCUMENTS

| 2,739,487 | A  | * | 3/1956 | Winther ......................... 74/330 |
| 4,966,048 | A  | * | 10/1990 | Braun ............................. 74/745 |
| 7,621,839 | B2 | * | 11/2009 | Jackson ....................... 475/214 |
| 2008/0134834 | A1 | * | 6/2008 | Gitt et al. ....................... 74/745 |
| 2008/0245167 | A1 | * | 10/2008 | Gitt ............................... 74/331 |
| 2010/0218643 | A1 | * | 9/2010 | Gitt et al. ..................... 74/665 F |

FOREIGN PATENT DOCUMENTS

WO    WO 00/39484        7/2000
WO    WO 01/88409 A2    11/2001

\* cited by examiner

*Primary Examiner* — Dirk Wright
(74) *Attorney, Agent, or Firm* — Klaus J. Bach

(57) ABSTRACT

In a load shift transmission for a utility vehicle having a transmission input shaft, a split group, a main group and a range group, a dual clutch with two input shafts, a main shaft and a countershaft with input constants including loose gear wheels, one loose gear wheel of an input constant is selectively rotationally fixedly connectable by means of shift elements to either one of the input shafts which can in each case be coupled by means of clutches (K1,K2) to the main transmission input shaft, the countershaft can be driven by one of three input constants with power being transmitted via the countershaft in all forward gears with the exception of a direct gear. The arrangement provides, with a simple design, for the possibility to carry out sequential shifts and multiple up-shifts and multiple down-shifts without an interruption in traction force.

16 Claims, 9 Drawing Sheets

LOAD-SHIFTABLE TRANSMISSION FOR A COMMERCIAL VEHICLE

This is a continuation-in-part application of pending international patent application PCT/EP2007/002744 filed Mar. 28, 2007 and claiming the priority of German patent application 10 2006 015 661.7 filed Apr. 4, 2006

BACKGROUND OF THE INVENTION

The invention relates to a load-shiftable transmission for a utility vehicle, comprising a split group, a main group and a range group.

WO 0039484 discloses a transmission, which can be shifted sequentially and without an interruption in traction force, for a motor vehicle, in particular a passenger motor vehicle, with six forward gears. In order to permit a high degree of variability with regard to shift processes without an interruption in traction force, even in the case of multiple up-shifts or downshifts. It is possible for the same transmission gears in the transmission to be used for different power flows via different shift elements and from different input shafts which are assigned to a dual clutch. For this purpose, a gearwheel of an input constant, which is mounted as a loose wheel on an input shaft, can be selectively coupled, by means of shift elements, which act at both sides of the loose wheel, to each input shaft, such that the loose wheel can be driven by both clutches and both input shafts. The transmission also has two countershafts which are driven in each case by an input constant, with one of the countershafts being a hollow shaft which is arranged coaxially with respect to the other countershaft and which is mounted radially within the other countershaft. It is possible for the drive torque to be transmitted from the countershafts to a drive output shaft via three gearwheel planes which are assigned in each case to forward gears, and via a gearwheel plane which is assigned to a reverse gear with the interposition of further shift elements. The transmission has a direct gear, for which an input shaft can be coupled to the drive output shaft of the transmission without the interposition of meshing gearwheel connections.

A patent application assigned to the assignee of the present application with the Ser. No. 12/075,789 and the title "Load-shiftable group transmission", which was not published before the priority date of the present application, discloses a transmission for a utility vehicle which has a split group, a main group and a range group and which has 12, 16 or 20 forward gears. Also, to ensure power splitting in individual transmission gears, the input shafts which are connected to the dual clutch drive two countershafts, which are arranged coaxially with respect to one another, in each case via an input constant.

Another application assigned to the assignee of the present application with the Ser. No. 12/008,833 and the title "Automatic powershift transmission", which was not published before the priority date of the present application, discloses a transmission for a utility vehicle, having a split group, a main group and a range group, with the power paths running via the same countershaft in all forward transmission gears with the exception of a direct gear which may be provided. Up to four sequentially power-shiftable transmission gears are possible in the region of a direct gear. The input constants can be selectively connected in each case to an associated input shaft and clutch of the dual clutch. Multiple up-shifts and multiple downshifts and a transfer of a drive torque from one clutch to another clutch for the same transmission gear are not discussed in said document.

Further transmissions in which input constants are assigned in each case to an individual clutch of a dual clutch and the power path extends via one of two coaxial countershafts depending on the clutch which is engaged are known from DE 4330170 C2, DE 10338355 A1 and U.S. Pat. No. 6,460,425 B1.

DE 10102028 A1 or DE 3546454 C2, represent further prior art with regard to transmissions with dual clutches.

It is the principle object of the present invention to provide a load- or power-shiftable transmission which can be used for a utility vehicle and which is improved with regard to structural expenditure, in particular with regard to the shift elements which are to be used, bearing arrangements and installation space, and the capability of shifting under load while simultaneously permitting multiple up-shifts or multiple downshifts without an interruption in traction force.

SUMMARY OF THE INVENTION

In a load shift transmission for a utility vehicle having a transmission input shaft, a split group, a main group and a range group, a dual clutch with two input shafts, a main shaft and a countershaft with input constants including loose gear wheels, one loose gear wheel of an input constant is selectively rotationally fixedly connectable by means of shift elements to either one of the input shafts which can in each case be coupled by means of clutches (K1,K2) to the main transmission input shaft, the countershaft can be driven by one of three input constants with power being transmitted via the countershaft in all forward gears with the exception of a direct gear. The arrangement provides, with a simple design, for the possibility to carry out sequential shifts and multiple up-shifts and multiple down-shifts without an interruption in traction force.

A transmission of said type is characterized firstly by the series arrangement of a split group, a main group and a range group, thereby providing a high degree of variability of the possible transmission gears while involving an acceptable level of structural expenditure, and by means of which even heavy utility vehicles can be driven in a finely graduated fashion with varying driving conditions.

Furthermore, input shafts which can be selectively driven by means of the dual clutch are arranged coaxially with respect to a drive output shaft of the transmission, resulting in good integration capability into a drive train of a utility vehicle.

The present invention is based on the fundamental concept as per WO 00/39484 with regard to permitting a connection of a loose wheel of an input constant to both input shafts. A loose wheel of said type may be either a loose wheel which is mounted so as to be rotatable with respect to the input shafts, that is to say a drive input wheel of the input constant, or as a loose wheel which is assigned to the countershaft, that is to say an output-side gearwheel of the input constant. The creation of the possibility of a connection of the loose wheel to both input shafts and therefore to both clutches leads, for a predefined number of gearwheel pairs and gearwheel planes, to the provision of several different power-shift possibilities, even for double up-shifts and -double downshifts under load, without it being necessary to provide additional gearwheel pairs. Furthermore, it is possible in such a way for the selectively drivable input constant to be placed in operative connection with the two input shafts and clutches in a structurally simple, space saving manner with a high level of efficiency and low losses by means of toothed engagement.

Furthermore, the selective connectability of the loose wheel makes it possible for a transmission gear and a change into it to take place optionally via one of the two clutches. Therefore, according to the invention, overloading of a clutch, for example when driving off, varying wear of the clutches and any impairments of a clutch can be allowed for, for example, by way of suitable control. This can also lead to an extension of the maintenance intervals for the transmission.

According to the invention, one of the two input shafts can be connected fixedly in terms of rotation to a main shaft of the main group via a shift element, with the result that a direct drive connection with an optimum degree of efficiency is obtained by the split group and the main group. By a range group being connected downstream, advantageous operation of this type can be used for a plurality of different transmission gears depending on the shifting state of the range group. It is particularly advantageous here that the range group likewise has a direct gear, in which no rolling gearwheels are connected in between into the power path in the range group. The overall transmission therefore has transmission gears which have a satisfactory degree of efficiency and in which a direct drive connection is provided by the split group and main group, and a transmission gear which has a further improved degree of efficiency and in which a direct gear is provided by the split group, the main group and the range group.

While, in WO 00/39484, the coaxial countershafts are selectively driven in each case by means of an input constant, which requires increased installation space as a result of the plurality of countershafts, the mounting of one countershaft, which is embodied as a hollow shaft, on the other countershaft, and the plurality of required shift elements, according to the invention, all of the transmission gears (with the exception of the direct gear) are operated via one and the same countershaft. This is not intended to exclude a power split taking place in such a way that two parallel countershafts are provided with similar power flows, with said two countershafts however both being disposed in the power path for all forward gears (with the exception of the direct gear).

Further advantages with regard to structural expenditure are provided as a result of the possibility, which is created according to the invention, that the gearwheels which are assigned to a countershaft can all be formed as fixed wheels, as a result of which it is possible to save on shift elements and additional installation space in the region of the countershaft. Furthermore, under some circumstances, an actuation of the shift elements entirely in the region of the common axis of the input shafts and the drive output shaft is possible, as a result of which compact, "centralized" actuators and electrical control units for said actuators can be provided.

Despite dispensing with the design of the transmission with two partial transmissions as per P807553/DE/1, it is possible to obtain the advantages described in said application which was not published before the priority date of the present application; in particular, it is possible to realize double downshifts or double up-shifts without an interruption in traction force, and also triple downshifts and triple up-shifts.

On the other hand, it is known from P807447/DE/1 for all the transmission gears with the exception of a direct gear to run via a single countershaft—for said known design, however, it is not possible for an input constant to be driven by both clutches and input shafts, resulting in a reduced degree of variability in particular with regard to multiple up-shifts and multiple downshifts without an interruption in traction force.

It is particularly advantageously possible for all the shift elements or sleeves to be arranged exclusively coaxially with respect to the input shafts. In this case, the actuator arrangement for actuating the shift elements can be of a particularly compact and cost-effective design. In this case, it is possible for only one countershaft to be provided, which then supports only fixed wheels. Such use of a single countershaft has cost, weight and installation space advantages, which are opposed by the disadvantage of a high degree of shaft bending and high bearing forces, since the forces on the teeth of the force-transmitting gears seek to push the two shafts, which are spaced apart from one another in parallel, away from one another. Such a high degree of shaft bending may be prevented for example by means of the use of a rolling bearing arrangement as per DE 10332210 A1. A further advantageous possibility for preventing high degrees of shaft bending and bearing loads is the use of two at least partially identical countershafts whose forces can cancel one another out. In such a case, the two countershafts may likewise be provided only with fixed wheels and/or have no shift sleeves.

According to a further embodiment of the invention, the input-side gearwheels of the input constant are utilized not only to transfer the drive torque to the countershaft. In fact, the drive torque is transmitted initially from an input shaft to the countershaft. The loose wheel which can be selectively connected to the two input shafts acts in said first input constant. Via a further "input constant", and in the "reversed" power flow, the power is re-circulated from the countershaft to the other input shaft, which is rotationally fixedly connected by means of a shift element to the main shaft of the main transmission. Gearwheel pairs of the main group are therefore not utilized for said transmission gear.

A particularly compact design of the transmission is produced if the connection between the input shaft (or the associated gearwheel for re-circulating power) and the main shaft of the main group is produced by means of that shift element which also brings about a connection of the input shaft to the main shaft in the direct gear.

The advantages described in the application Ser. No. 12/075,789 and 12/048,833, which were not published before the priority date of the present application, may likewise be utilized according to the invention if groups of transmission gears can be shifted sequentially.

Improved comfort and an improved power-shift characteristic are provided if double up-shifts or double downshifts, or multiple up-shifts or multiple downshifts, are possible without an interruption in traction force, by means of which the shift state of the transmission can be adapted in an even more individual fashion to the respective driving conditions.

While adjacent gears can conventionally be activated and deactivated in each case by means of different clutches, which has the result that transmission gears which differ by a number of 2 are activated by means of said clutches, the capacity for the selective connection of the loose wheel to both clutches provides the possibility of using both clutches during a double up-shift or double downshift, as a result of which said double up-shift or double downshift can be designed to take place without an interruption in tractive force for the first time. If a sequential shift process to an adjacent transmission gear is to take place after a double up-shift or double downshift of said type, there can be the problem that said adjacent transmission gear must take place via the clutch which is utilized for the double up-shift or double downshift. For this purpose, the invention proposes that, in such a case, a transfer takes place from one clutch of the dual clutch, and the input shaft which is connected thereto, to the other clutch of the dual clutch, and the input shaft which is connected thereto, in preparation for the sequential shift. It is therefore possible for both the double up-shift or double downshift and also a subsequent sequential shift to take place without an interruption in traction force.

According to the invention, it is possible to obtain a further improvement in efficiency in that, in the direct gear, some or all of the input constants are not drive-connected to the input shafts. In this way, it is possible for bearing friction, any splashing losses and the inertial mass which is moved in the direct gear to be reduced. It is particularly advantageous here if the input constants have input-side gearwheels, which constitute loose wheels on the input shafts and which can therefore be decoupled from the input shafts in the direct gear.

For configuring the transmission for maximum driving speed, it can be advantageous if at least one overdrive transmission gear (transmission ratio i<1) is provided. In this case, increased driving comfort is provided if the shift process from the direct gear to the at least one overdrive transmission gear (and vice versa) is possible without an interruption in traction force.

According to a refinement of the invention for the power-shift transmission, the range group is embodied as a planetary gear set, which is characterized by a simple coaxial configuration, small radial installation space, and favorable torque and speed conditions. For a planetary gear set of said type, a direct gear may be formed in that, in a direct gear of said type, the planetary gear set rotates as a block. A different shift state of the planetary gear set may for example consist in a transmission element of the planetary gear set, for example a ring gear being ring gear being braked with respect to the housing.

The driving comfort of the power-shift transmission can be further increased according to the invention in that an uppermost group of sequentially power-shiftable transmission gears comprises five transmission gears, for which the shift state of the transmission can therefore be adapted for comfortable operating conditions at high vehicle speeds.

To reduce the structural expenditure for individual shift elements or for all shift elements, the invention proposes that at least one shift element is formed as a non-synchronized shift element. In such a case, a synchronization of one or more shift elements can take place in individual gears, or in a plurality of gears, by means of a central synchronizing device, which may be a central brake or a drive unit for gearwheels or transmission shafts.

In one particular embodiment of the power-shift transmission according to the invention, a central synchronizing device of this type is in the form of a countershaft brake.

The invention and advantageous refinements thereof will become more readily apparent from the following description of a preferred exemplary embodiment of the device according to the invention on the basis of the accompanying drawings.

BRIEF DESCRIPTION OF THE DRAWINGS

FIG. 1, FIGS. 3-12 show the sequence of shift states of the shift elements of the transmission as per FIG. 1 for a double downshift from a $12^{th}$ transmission gear to a $10^{th}$ transmission gear with a subsequent sequential load shift from the $10^{th}$ transmission gear into an $11^{th}$ transmission gear.

BRIEF DESCRIPTION OF A PREFERRED EMBODIMENT

Figure 1:
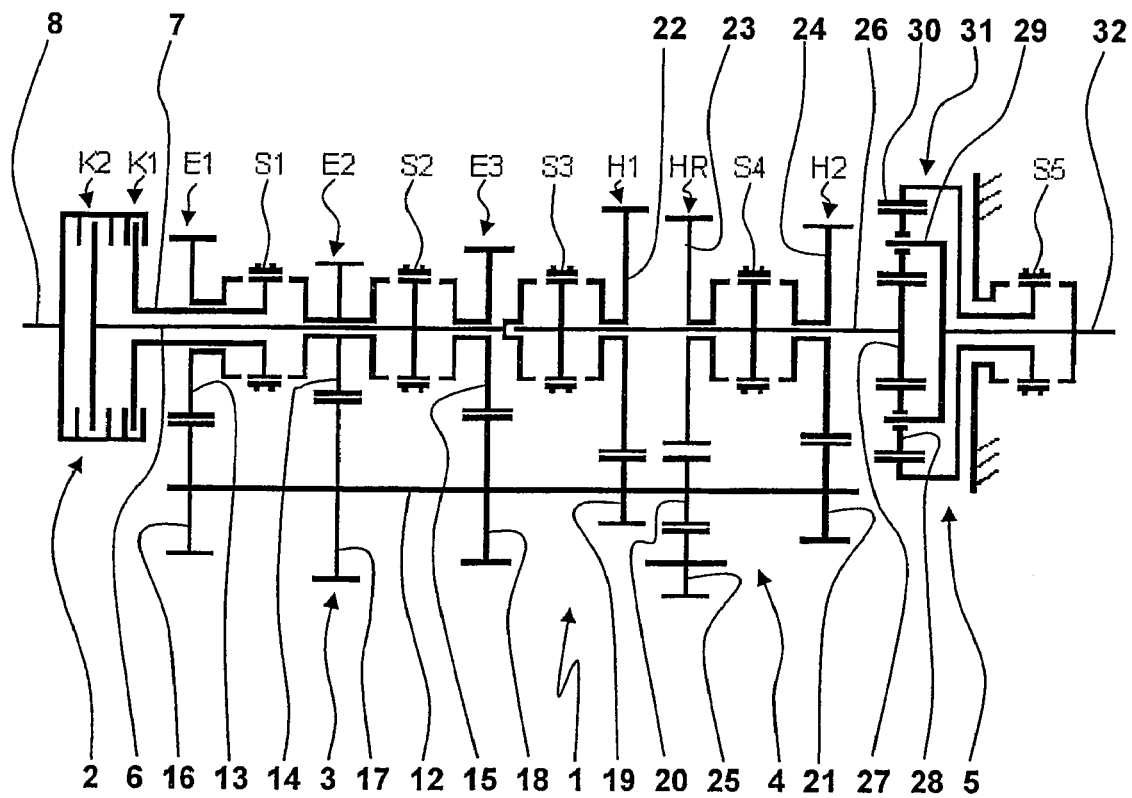
FIG. 1 shows a wheel plan of a load-shiftable transmission according to the invention for a utility vehicle with 18 or 20 forward gears.

FIG. 1 shows a power- or load-shiftable transmission 1 having a dual clutch 2 with two clutches K1 and K2, a split group 3, a main group 4 and a range group 5.

The split group 3 has first and second input shafts 6, 7 which can, by means of the clutches K1, K2, be placed in drive-connection with a transmission input shaft 8 selectively by overlap control. In the split group 3, a countershaft 12 can be driven with different transmission ratios by means of input constants E1, E2 and E3 with associated gearwheel planes. The input constants E1, E2, E3 have drive-input-side gearwheels 13 to 15 which are in constant meshing connection to drive-output-side gearwheels 16 to 18 of the input constants E1, E2 and E3. The gearwheels 13 to 15 are loose wheels, with the gearwheel 13 being mounted so as to be rotatable with respect to the second input shaft 7, while the gearwheels 14, 15 are mounted so as to be rotatable with respect to the first input shaft 6. The second input shaft 7 is a hollow shaft and surrounds the first input shaft 6 with the interposition of a bearing arrangement.

By means of a shift element S1, the second input shaft 7 can, in a shift position S1 (E1), be rotationally fixedly connected to the gearwheel 13, and in a shift position S1 (E2), be rotationally fixedly connected to the gearwheel 14, while no connection between the gearwheels 13, 14 and the second input shaft 7 is created by means of the shift element S1 in the central, neutral position which is illustrated.

A shift element S2, in a shift position S2 (E2), rotationally fixedly connects the gearwheel 14 to the first input shaft 6 and, in a shift position S2 (E3), rotationally fixedly connects the gearwheel 15 to the first input shaft 6, while no connection of the gearwheels 13, 14 to the first input shaft 6 is provided by means of the shift element S2 in the central, neutral position of the shift element S2 which is shown.

In the region of the main group 4, the countershaft 12 supports drive-input-side gearwheels 19, 20, 21 which mesh constantly with drive-output-side gearwheels 22, 23, 24 in gearwheel planes H1, HR, H2, with a reverse gear gearwheel 25 being interconnected between the gearwheels 20 and 23. The gearwheels 22-24 are in each case loose wheels with respect to a main shaft 26 of the main group 4, which main shaft 26 is itself mounted with respect to the first input shaft 6 by means of a pilot bearing arrangement.

By means of a shift element S3, the main shaft 26 can, in a left-hand shift position S3(1), be rotationally fixedly connected to the first input shaft 6 and, in a right-hand shift position S3(H1), be rotationally fixedly connected to the gearwheel 22, while the shift element S3 is inactive in the central, neutral position which is shown.

A shift element S4 (which is inactive in the central, neutral position which is shown) connects, in a shift position S4(HR), the gearwheel 23 to the main shaft 26, while, in a shift position S4(H2), a rotationally fixed connection is created between the gearwheel 24 and main shaft 26.

The range group 5 has transmission elements in the form of a sun gear 27 which is rotationally fixedly connected to the main shaft 26, planets 28 which are rotatably mounted by means of a planetary gear carrier 29, and a ring gear 30, by means of which a planetary gear set 31 is formed, in a manner known per se. The planetary gear carrier 29 is rotationally fixedly connected to a drive output shaft 32 or transmission output shaft.

A shift element S5 is inactive in the central, neutral position which is illustrated, while in a left-hand shift position S5(1), said shift element S5 rotationally fixedly connects the ring gear 30 to the housing or brakes said ring gear 30 with respect to said housing, while in a right-hand shift position S5(2), the ring gear 30 is rotationally fixedly connected to the drive output shaft 32, such that the planetary gear set 31 is locked and is locked and rotates as a block.

The following table 1 shows the clutch states and shift states for the clutches K2, K1 and the shift elements S1 to S5 for the transmission gears 1 to 18 and for the reverse transmission gears R1 to R6, with triangles indicating the clutch which is closed in each case, while filled circles indicate the shift position of the shift elements which are active, and empty circles denote shift elements which are in a neutral position.

TABLE 1

Shift states for a transmission variant with 18 (17 + 1) gears (speeds)

| Gear | K2 | K1 | S1 | | | S2 | | | S3 | | | S4 | | | S5 | |
|---|---|---|---|---|---|---|---|---|---|---|---|---|---|---|---|---|
| | | | E1 | N | E2 | E2 | N | E3 | 1 | N | H1 | HR | N | H2 | 1 | 2 |
| 1 | | ▲ | | | ● | | ● | | | | ● | | ○ | | ● | |
| 2 | ▲ | | | ○ | | | ● | | | | ● | | ○ | | ● | |
| 3 | | ▲ | ● | | | | ○ | | | | ● | | ○ | | ● | |
| 4 | | ▲ | | ● | | | ○ | | | ○ | | | | ● | ● | |
| 5 | ▲ | | | ○ | | | ● | | | ○ | | | | ● | ● | |
| 6 | | ▲ | ● | | | | ○ | | | ○ | | | | ● | ● | |
| 7 | ▲ | | | | ● | | ○ | | ● | | | | ○ | | ● | |
| 8 | | ▲ | | ● | | ● | | ● | | | | | ○ | | ● | |
| 9 | | ▲ | ● | | | ● | | ● | | | | | ○ | | ● | |
| 10 | | ▲ | | | ● | | ○ | | | | ● | | ○ | | | ● |
| 11 | ▲ | | | ○ | | | ● | | | | ● | | ○ | | | ● |
| 12 | | ▲ | ● | | | | ○ | | | | ● | | ○ | | | ● |
| 13 | | ▲ | | | ● | | ○ | | | ○ | | | | ● | | ● |
| 14 | ▲ | | | ○ | | | ● | | | ○ | | | | ● | | ● |
| 15 | | ▲ | ● | | | | ○ | | | ○ | | | | ● | | ● |
| 16 | ▲ | | | | ● | | ○ | | ● | | | | ○ | | | ● |
| 17 | | ▲ | | ● | | ● | | ● | | | | | ○ | | | ● |
| (18) | | ▲ | ● | | | ● | | ● | | | | | ○ | | | ● |
| R1 | | ▲ | | | ● | | ○ | | | ○ | | ● | | ● | | ● |
| R2 | ▲ | | | ○ | | | ● | | | ○ | | ● | | ● | | ● |
| R3 | | ▲ | ● | | | | ○ | | | ○ | | ● | | ● | | ● |
| R4 | | ▲ | | | ● | | ○ | | | ○ | | ● | | | | ● |
| R5 | ▲ | | | ○ | | | ● | | | ○ | | ● | | | | ● |
| R6 | | ▲ | ● | | | | ○ | | | ○ | | ● | | | | ● |

Furthermore, in table 1, the grouping-together of groups of rows and the separation by double lines denotes which transmission gears can be shifted sequentially and without an interruption in traction force, specifically transmission gears 1 to 3, transmission gears 4 to 8, transmission gears 10 to 12, transmission gears 13 to 17.

Figure 2:
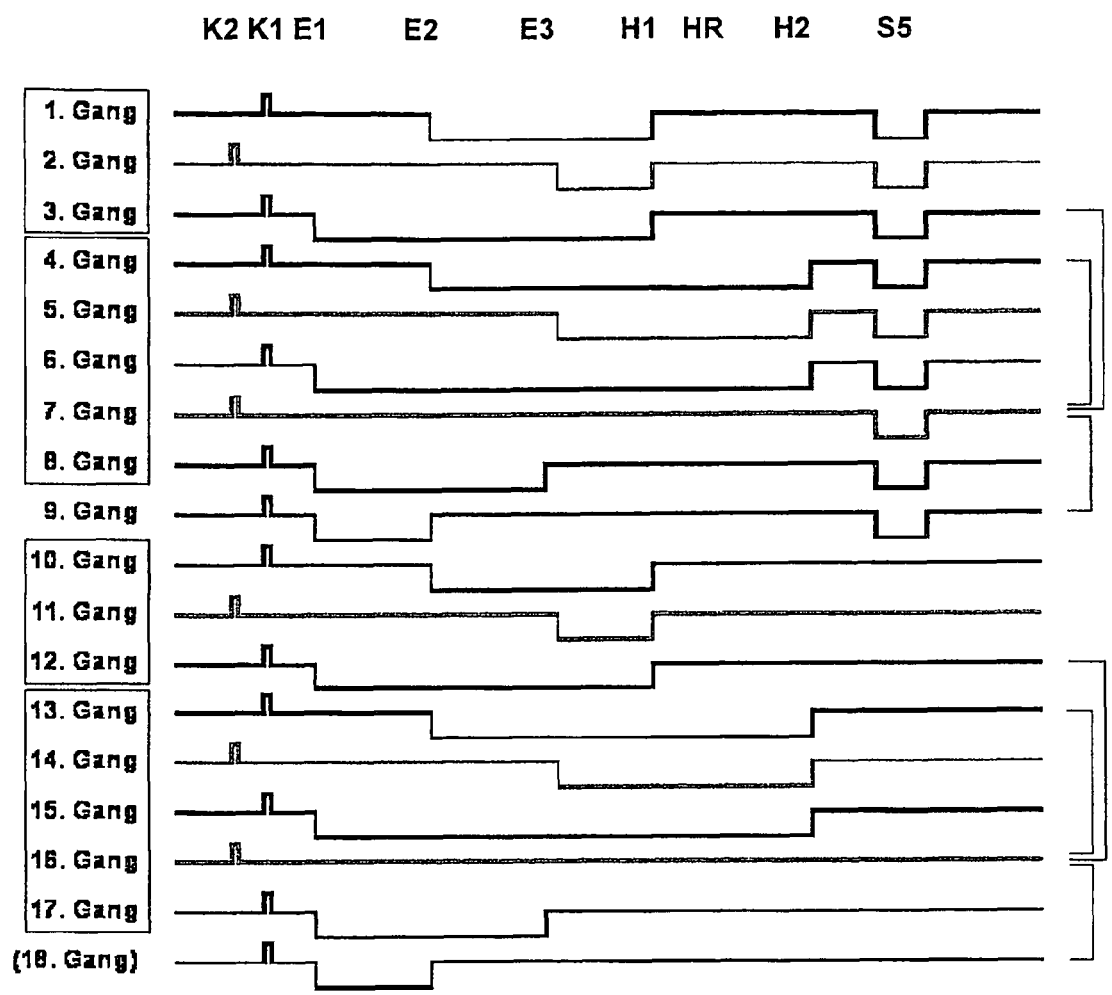
FIG. 2 shows the power flow in 18 forward gears for the transmission as per

The power flow in the individual transmission gears is shown in FIG. 2, from which it can be seen that the $16^{th}$ gear is designed as a direct gear, in which the power flow extends via the transmission element 8, clutch K2, input shaft 6, shift element S3, main shaft 26 and via the blocked planetary gear set 31 to the drive output shaft 32. A similar direct transmission of the drive torque takes place in the $7^{th}$ gear in the split group 3 and the main group 4, with the shift element S5 in this case being in the shift position S5 (1), such that the planetary gear set 31 creates a transmission ratio I>1.

For the transmission gears 1-3 and 4 to 6 and 10 to 12 and 13 to 15, the input constants E2, E3, E1 are used in the stated sequence, with the gearwheel plane H1 being used in the transmission gears 1 to 3 in the main group 4, the gearwheel plane H2 being used in the transmission gears 4 to 6, the gearwheel plane H1 being used in transmission gears 10 to 12, and the gearwheel plane H2 being used in transmission gears 13 to 15. In transmission gears 8 and 9 and 17 and 18, no power is transmitted via the gearwheel planes H1, HR, H2, since the power is re-circulated in the region of the input constant E2 (transmission gears 9, 18) and the input constant E3 (transmission gears 8, 17), in each case with the upstream series connection of the input constant E1.

Possible power shifts are denoted by brackets at the right-hand edge of FIG. 2.

The transmission gears 17 and 18 form overdrive transmission gears with an overall transmission ratio of i<1. It is not possible to shift without an interruption in traction force between the two overdrive transmission gears 17 and 18. However, it is possible to shift to the overdrive transmission gear 18 from the direct gear 16 without an interruption in traction force.

Figure 3:
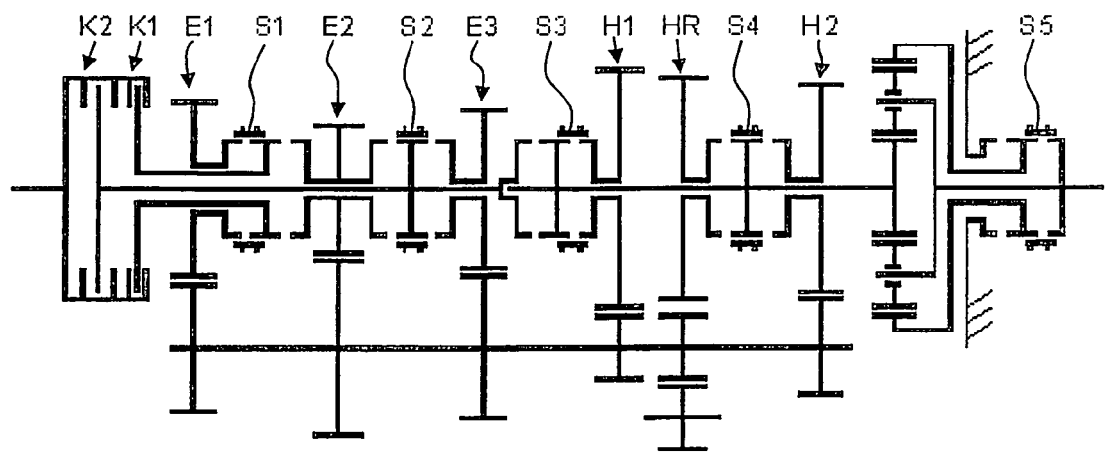

FIG. 3 shows the transmission for an activated $12^{th}$ transmission gears. In the transmission gear, the power flow runs via the clutch K1, shift element S1 in the shift position S1(E1), gearwheels 13, 16, countershaft 12, gearwheels 19, 22, shift element S3 in the shift position S3(H1), main shaft 26 and planetary gear set 31, which is blocked as a result of shift element S5 being in the shift position S5(2), to the drive output shaft 32.

Figure 4:
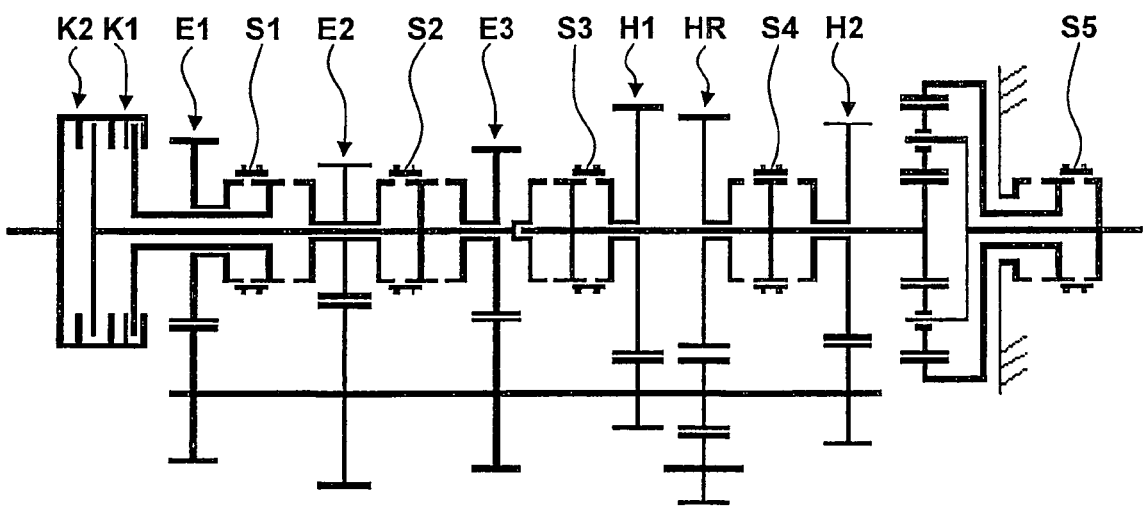

For a double downshift from the transmission gear 12 to the transmission gear 10, the gearwheel 14 is firstly connected, by means of shift element S2 which is placed into the shift position S2(E2), to the input shaft 6, without the clutch K2 being closed, see FIG. 4.

Figure 5:
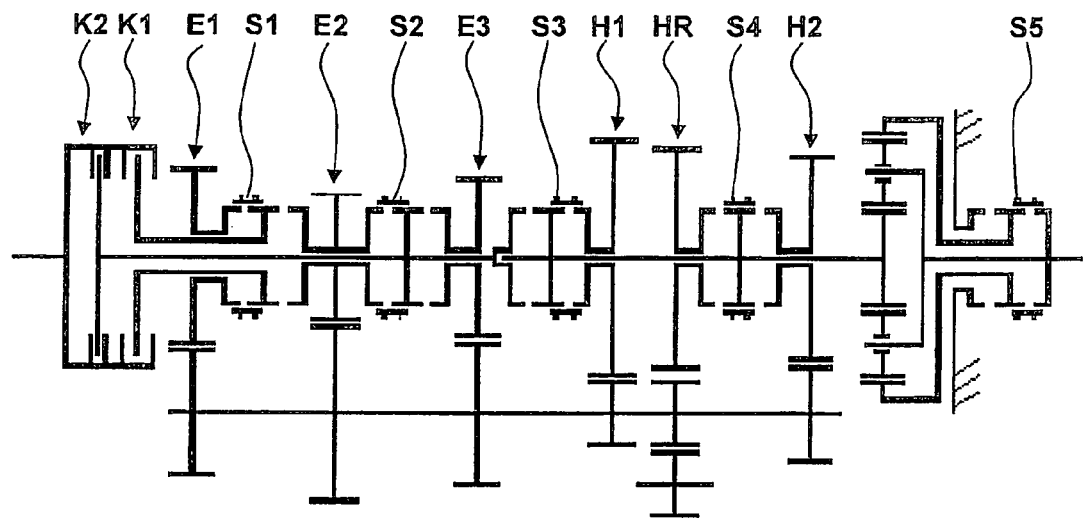

By means of suitable crossover control, the torque is then transferred from the clutch K1 to the clutch K2, such that the power flow runs from the transmission input shaft 8 via the clutch K2, shift element S2 in the shift position S2(E2), gearwheels 14, 17, countershaft 12, gearwheels 19, 22, shift element S3 in the shift position S3(H1), main shaft 26 and the blocked planetary gear set 31 (FIG. 5).

Figure 6:
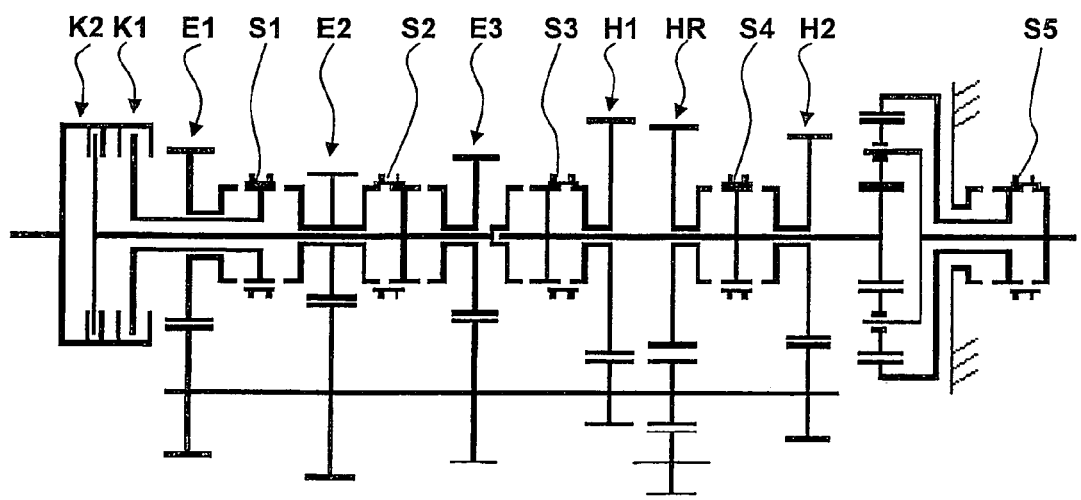

As per FIG. 6, the gearwheel 13 of the input constant E1 is subsequently decoupled from the input shaft 7 in that the shift element S1 is moved from the shift position S1(E1) into the neutral position.

Figure 7:
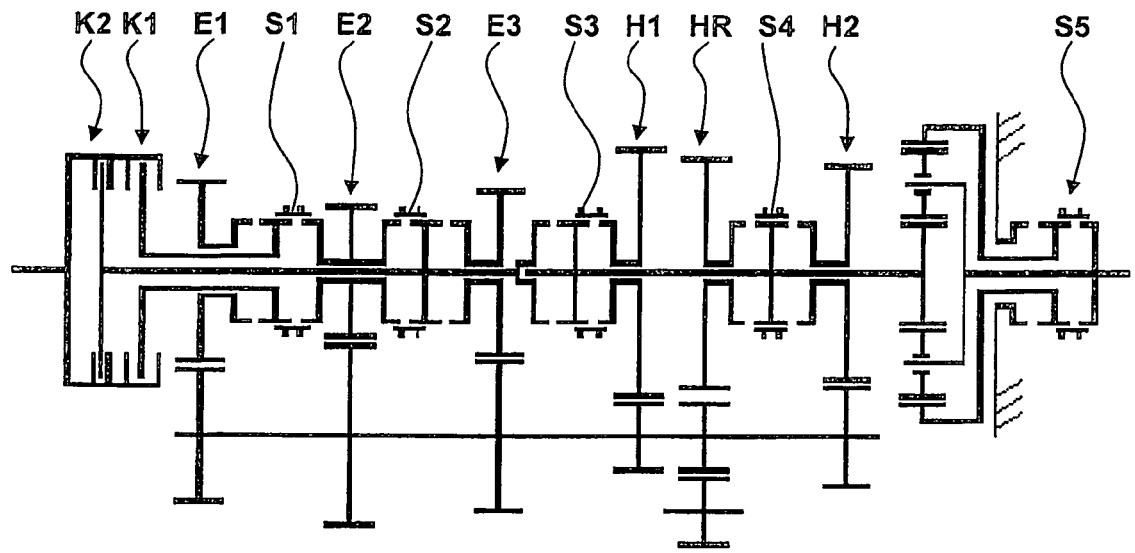

As per FIG. 7, the gearwheel 14 is now coupled to the transmission shaft 7 in that the shift element S1 is placed into the shift position S1(E2).

Figure 8:
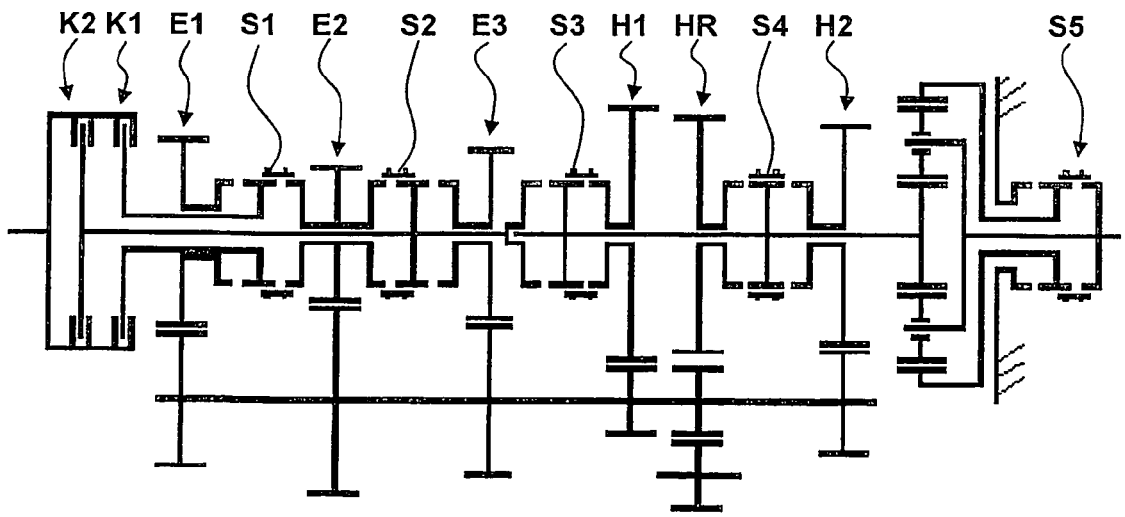

By means of suitable overlap control, the clutch K1 is likewise closed, as per FIG. 8.

Figure 9:
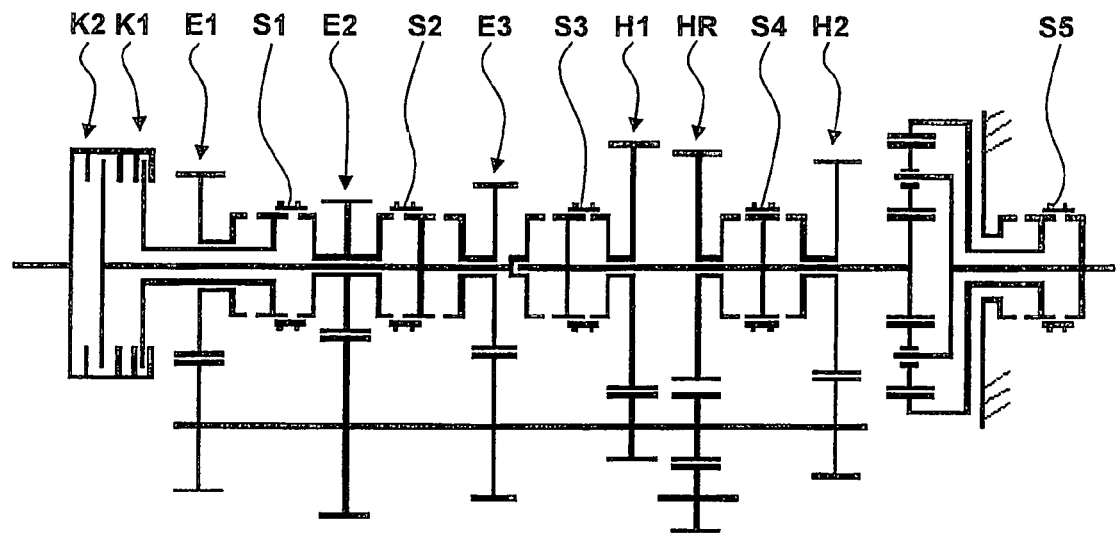

As per FIG. 9, the clutch K2 is then opened, such that the power flow extends from the transmission input shaft 8 via the clutch K1, the input shaft 7, the shift element S1, the input constant E2 with gearwheels 14, 17, countershaft 12, gearwheel 19, 22, shift element S3, main shaft 26 and via the blocked planetary gear set 31 to the drive output shaft 32.

Figure 10:
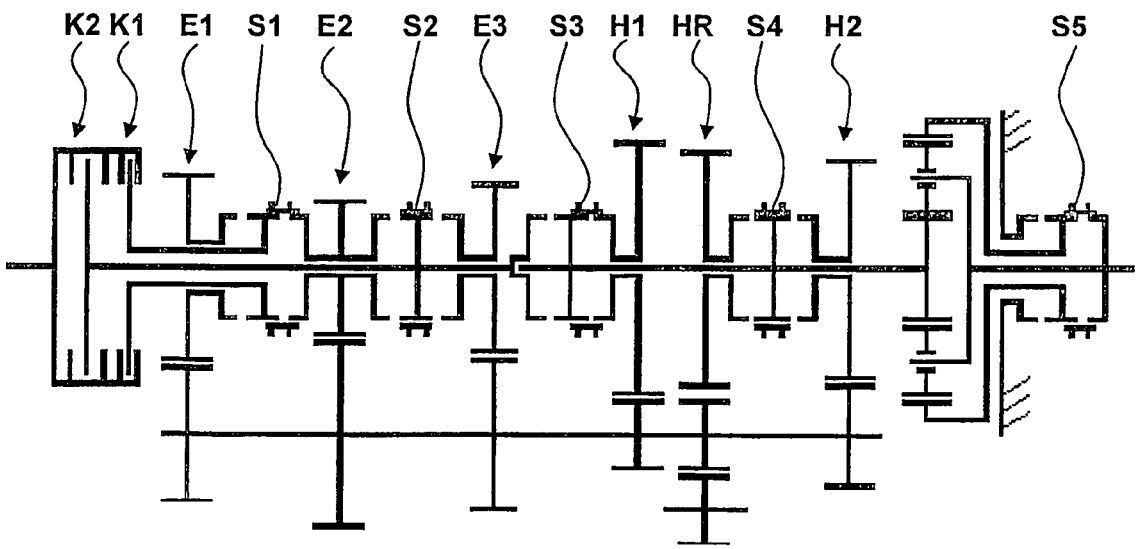

The gearwheel 14 is subsequently decoupled from the input shaft 6 in that the shift element S2 is placed, as per FIG. 10, into the shift position S2(N). The shift state specified in table 1 for the shift state in transmission gear 10 is hereby attained.

Figure 11:
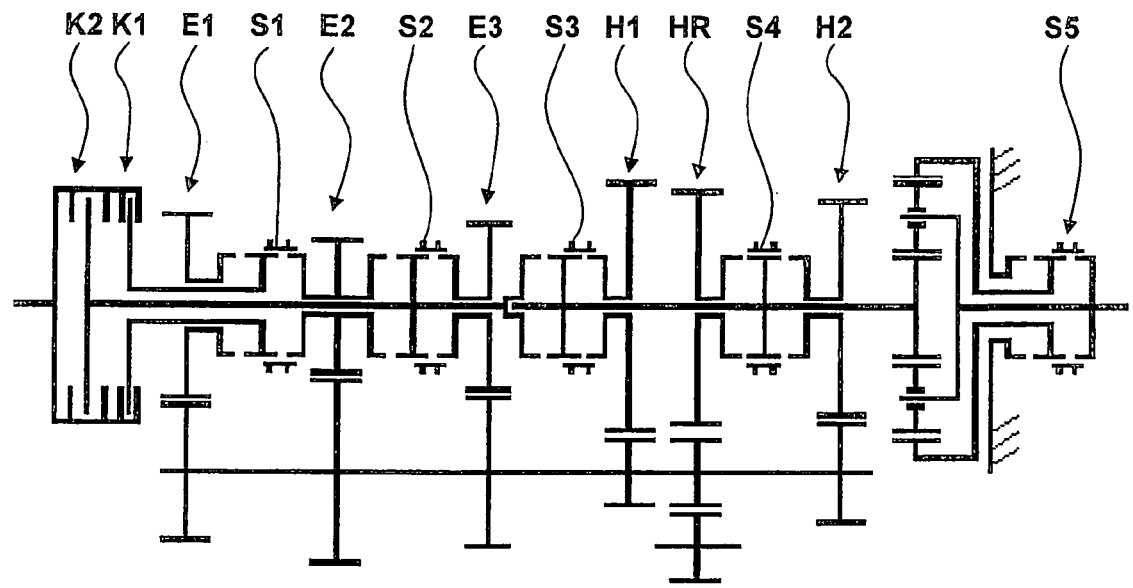

For a sequential shift into the transmission gear 11, the gearwheel 15 of the input constant E3 is, as per FIG. 11, rotationally fixedly connected to the input shaft 6 by means of the shift element S2 being moved into the shift position S2(E3).

Figure 12:
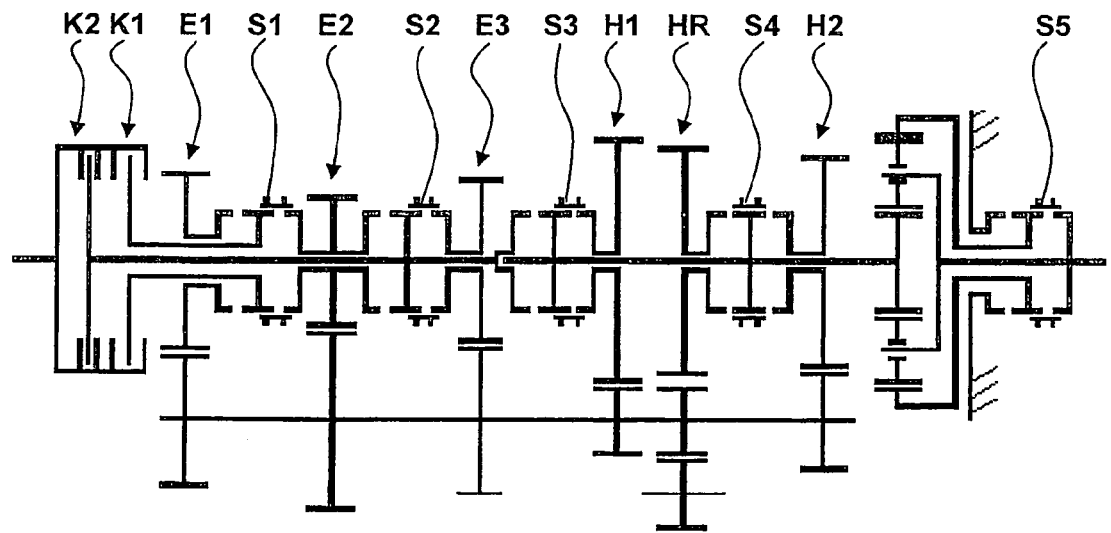

An activation of the 11$^{th}$ transmission gear takes place, as per FIG. 12, by means of the transfer of the drive torque from the clutch K1 to the clutch K2. The shift state which is illustrated in FIG. 12 corresponds here to the shift state specified in table 1 for the transmission gear 11.

For the illustrated transmission 1, multiple gearshifts are possible between the transmission gears 3 and 7, 4 and 7, 7 and 9, 12 and 16, 13 and 16 and 16 and 18. As a result of the selective capacity, according to the invention, for the connection of the gearwheel 14 both to the input shaft 6 and also to the input shaft 7, additional double shifts are possible without an interruption in traction force, specifically between the transmission gears 1 and 3, 4 and 6, 10 and 12 and 13 and 15. In general, this means that a double up-shift or double down-shift is generally possible between two split gears, which are not directly adjacent, with identical transmission ratio in the main group. Here, the in each case "middle transmission ratio" in the split group is omitted in the shift sequence.

For a double up-shift from the transmission gear 10 into the transmission gear 12, it is necessary, proceeding from the transmission sped 10, for the gearwheel 14 of the input constant E2 to be rotationally fixedly connected to the input shaft 6, as is the case in the shift position S2(E2). The gearwheel 14, however, is also connected to the input shaft 7 by means of the shift element S1 in the shift position S1(E2). In a subsequent step, said connection is released by virtue of the gearwheel 14 being decoupled from the input shaft 7 by moving the shift element S1 into the position S1(N). The gearwheel 13 is subsequently connected to the input shaft 7 in that the shift element S1 is moved into the shift position S1(E1). In the next step, the drive torque can be transferred from the clutch K2, which is connected to the input shaft 6, to the clutch K1, which is connected to the input shaft 7. The double up-shift is complete once the clutch K2 is completely open and the clutch K1 is completely closed.

If, in a driving situation, for example in a relatively low transmission gear, it can be foreseen that transmission gears can be omitted during an up-shift, it is possible to use a shift strategy in which the gearwheel 14 of the input constant E2 is connected to the input shaft 6 from the outset, such that the above-described "changeover" of the rotationally fixed connection from the input shaft 6 to the input shaft 7 can be avoided in the event of the multiple up-shift being required.

Figure 13:
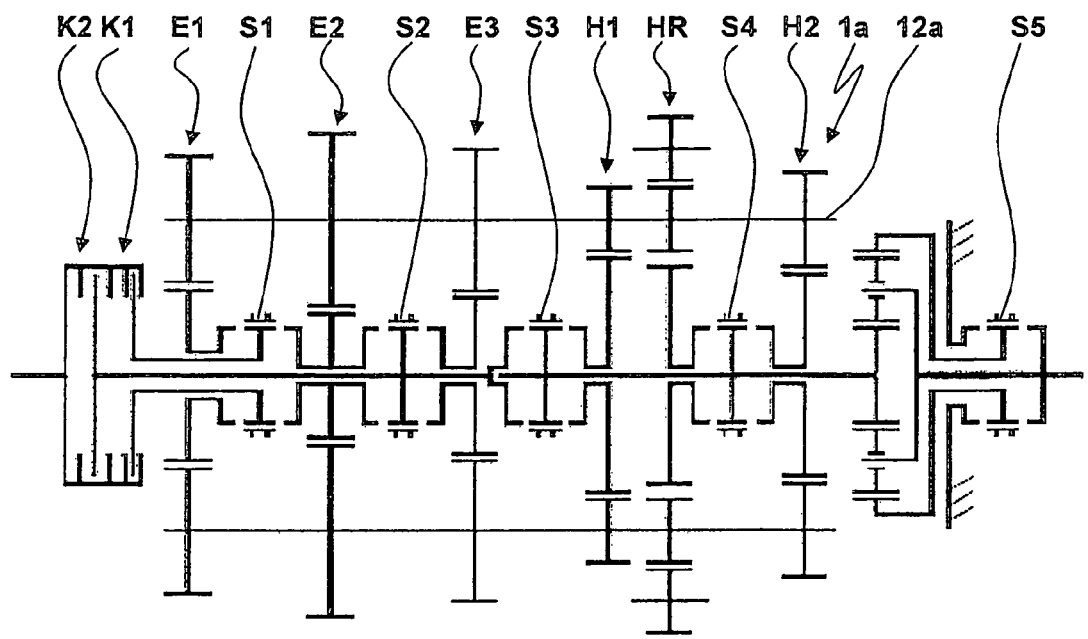
FIG. 13 shows an alternative configuration of a wheel plan for a load-shiftable transmission according to the invention, in which the power flow is divided between two countershafts which are of substantially corresponding design.

FIG. 13 shows a further configuration of the transmission 1a according to the invention, which corresponds substantially to the transmission 1 as per FIGS. 1 to 12. However, an additional countershaft 12a is provided which, with regard to the meshing connections and the gearwheels which are arranged on the countershaft 12a, corresponds to the countershaft 12. In this way, the power which is transmitted between the transmission input shaft 8 and the drive output shaft 32, and the torque in the region of the split group 3 and the main group 4, can be divided between two power paths, as a result of which the loading on the components is reduced, and reduced dimensioning is made possible, for example of shafts, gearwheels and bearings.

Figure 14:
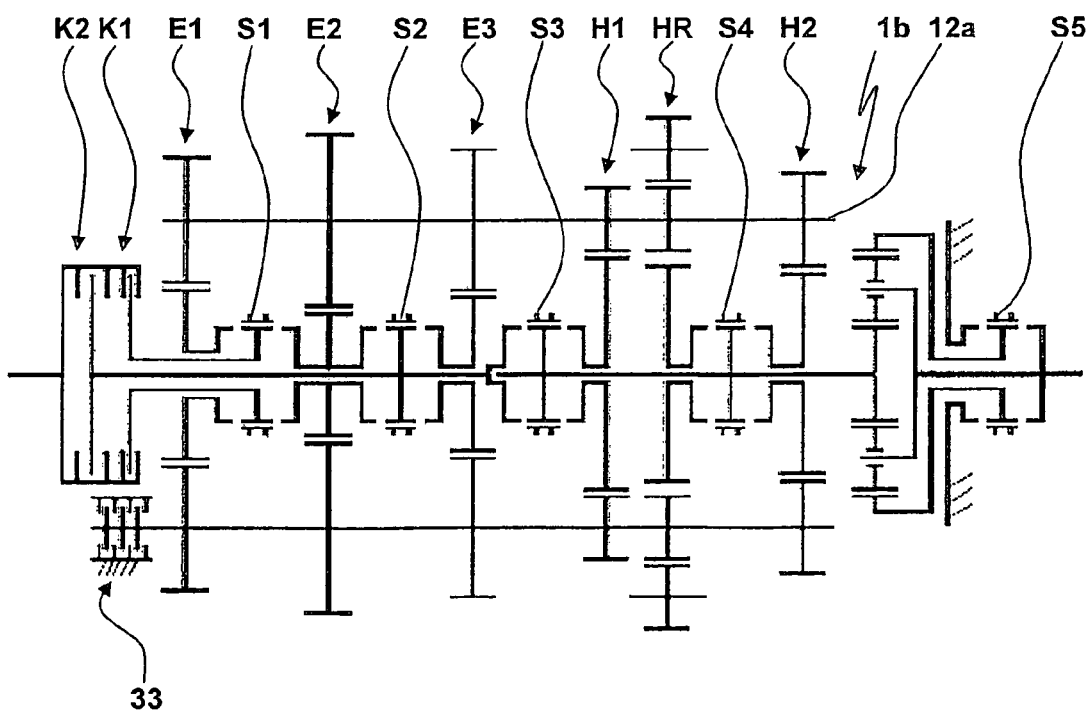
FIG. 14 shows an alternative configuration of a wheel plan of a load-shiftable transmission according to the invention with a countershaft brake for synchronization during shift processes.

FIG. 14 shows, with a configuration of the transmission 1b which otherwise corresponds to FIG. 13, an arrangement of a countershaft brake 33, by means of which the speed of the countershaft 12 can be varied for synchronization during a shift process with at least partially non-synchronized shift elements.

Figure 15:
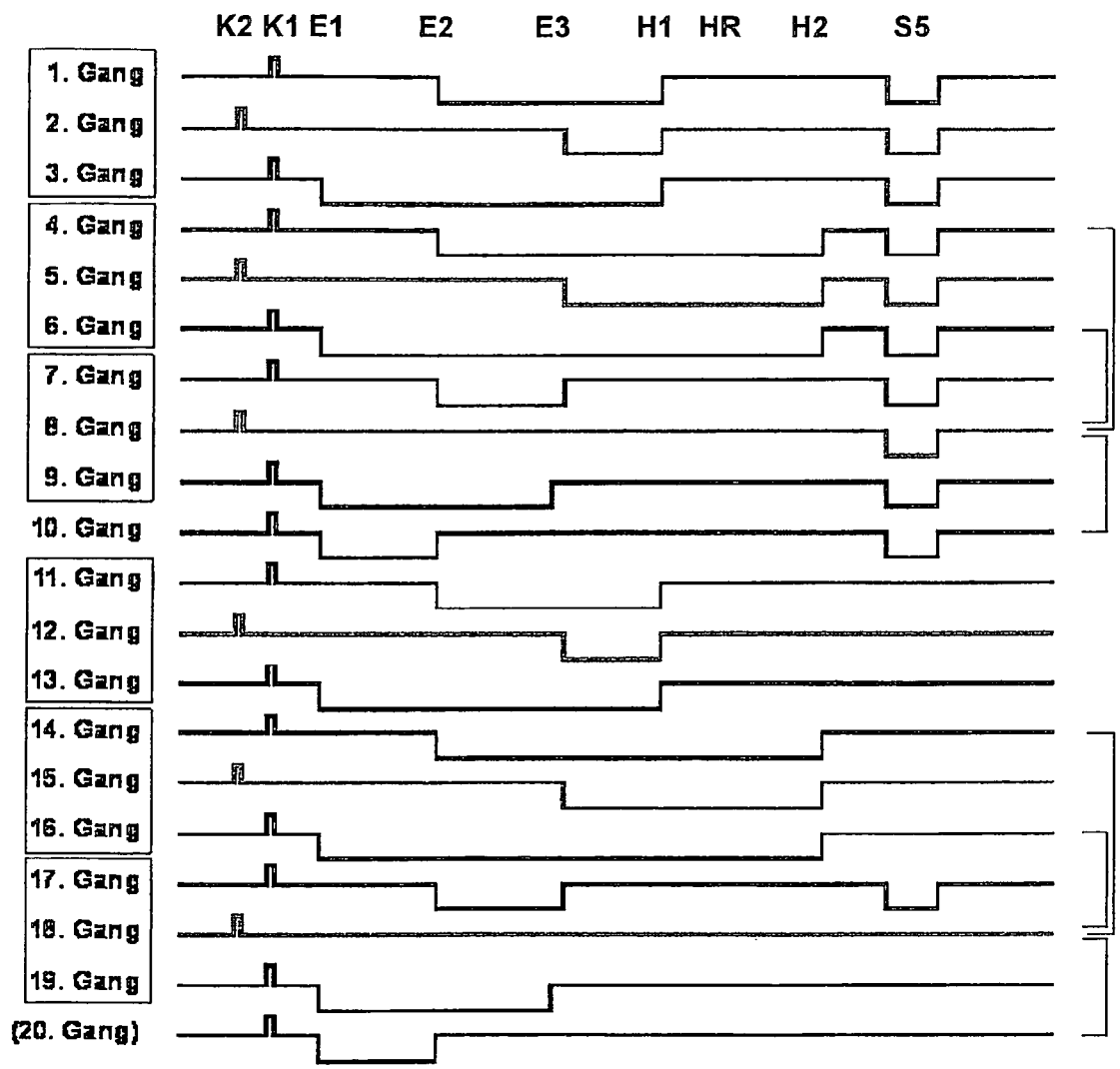
FIG. 15 shows the power flows for the exemplary embodiment of a load-shiftable transmission illustrated in FIG. 1, using 20 forward transmission gears.

As per the power flow which is illustrated in FIG. 15 with the shift states specified in table 2, the use of 20 forward gears is also possible for the transmission 1, 1a, 1b illustrated in FIGS. 1 to 14: in an additional 7$^{th}$ transmission gear and an additional 17$^{th}$ transmission gears, it is possible to use a combination of the input constants E2 and E3 to form a transmission ratio with i>1. In contrast to the exemplary embodiments as per FIGS. 1 to 14, an uppermost group of power- or load-shiftable adjacent gears in this case no longer comprises 5 transmission gears, but rather only 3 transmission gears.

TABLE 2

Shift states for a transmission variant with 20 (19 + 1) gears (speeds)

| Gear | K2 | K1 | S1 1 | S1 N | S1 2 | S2 1 | S2 N | S2 2 | S3 1 | S3 N | S3 2 | S4 1 | S4 N | S4 2 | S5 1 | S5 2 |
|---|---|---|---|---|---|---|---|---|---|---|---|---|---|---|---|---|
| 1 |   | ▲ |   | ● |   | ○ |   |   |   | ● |   |   | ● |   | ○ | ● |
| 2 | ▲ |   |   | ○ |   |   | ● |   |   | ● |   |   | ● |   | ○ | ● |
| 3 |   | ▲ | ● |   |   |   | ○ |   |   | ● |   |   | ● |   | ○ | ● |
| 4 |   | ▲ |   | ● |   |   | ○ |   | ○ |   |   |   |   | ● | ● |   |
| 5 | ▲ |   |   | ○ |   |   |   | ● | ○ |   |   |   |   | ● | ● |   |
| 6 |   | ▲ | ● |   |   |   | ○ |   | ○ |   |   |   |   | ● | ● |   |
| 7 |   | ▲ |   |   |   | ● | ● |   |   |   |   | ○ |   |   | ● |   |
| 8 | ▲ |   |   |   |   |   | ○ |   | ● |   |   | ○ |   |   | ● |   |
| 9 |   | ▲ |   |   |   | ● |   |   | ● | ● |   | ○ |   |   | ● |   |
| 10 |   | ▲ | ● |   |   | ● |   |   |   | ● |   | ○ |   |   | ● |   |
| 11 |   | ▲ |   |   |   | ● |   |   | ○ |   |   | ● | ○ |   |   | ● |

TABLE 2-continued

Shift states for a transmission variant with 20 (19 + 1) gears (speeds)

| Gear | K2 | K1 | S1 1 | S1 N | S1 2 | S2 1 | S2 N | S2 2 | S3 1 | S3 N | S3 2 | S4 1 | S4 N | S4 2 | S5 1 | S5 2 |
|---|---|---|---|---|---|---|---|---|---|---|---|---|---|---|---|---|
| 12 | ▲ |  |  | ○ |  |  |  | ● | ● |  |  |  | ○ |  |  | ● |
| 13 |  | ▲ | ● |  |  |  | ○ |  | ● |  |  |  | ○ |  |  | ● |
| 14 |  | ▲ |  |  | ● |  | ○ |  |  | ○ |  |  |  | ● |  | ● |
| 15 | ▲ |  |  | ○ |  |  |  | ● |  | ○ |  |  |  | ● |  | ● |
| 16 |  | ▲ | ● |  |  |  | ○ |  |  | ○ |  |  |  | ● |  | ● |
| 17 |  | ▲ |  |  | ● | ● |  |  |  | ○ |  |  | ○ |  |  | ● |
| 18 | ▲ |  |  |  | ● |  |  | ● | ● |  |  |  | ○ |  |  | ● |
| 19 |  | ▲ |  |  | ● |  |  | ● | ● |  |  |  | ○ |  |  | ● |
| (20) |  | ▲ | ● |  |  |  | ○ |  |  |  |  |  | ○ |  |  | ● |
| R1 |  | ▲ |  |  | ● |  | ○ |  |  | ○ |  | ● |  |  | ● |  |
| R2 | ▲ |  |  | ○ |  |  |  | ● |  | ○ |  | ● |  |  | ● |  |
| R3 |  | ▲ |  |  | ● |  | ○ |  |  | ○ |  | ● |  |  |  | ● |
| R4 |  | ▲ |  |  | ● |  | ○ |  |  | ○ |  | ● |  |  |  | ● |
| R5 | ▲ |  |  | ○ |  |  |  | ● |  | ○ |  | ● |  |  |  | ● |
| R6 |  | ▲ | ● |  |  |  | ○ |  |  | ○ |  | ● |  |  |  | ● |

For the illustrated exemplary embodiments, the input shafts 6, 7 are designed so as to be relatively long, with it being possible for comparatively high radial forces and resulting torques to be generated as a result of the toothed engagement of the input constants E1, E2, E3, which forces and torques can be absorbed by means of additional bearing arrangements of the input shafts 6, 7. A further additional or alternative remedial measure is possible by means of the described division and reciprocal compensation of the forces and torques by using two countershafts 12, 12a as per FIG. 13.

What is claimed is:

1. A load shift transmission (1) for a utility vehicle, comprising a main input shaft (8), a split group (3), a main group (4) and a range group (5), and having a dual clutch (2) with two operating clutches (K1, K2), a main shaft (26) and at least one countershaft (12, 12a), the split group (3) including concentric inner and outer input shafts (6, 7) and the countershafts (12, 12a) having a plurality of input constants (E1, E2, E3) comprising loose gearwheels (13, 14, 15) on the outer input shaft (7) and first and second shift elements (S1, S2) for connecting the outer input shaft (7) selectively via one of the loose gear wheels (13, 14, 15) to the at least one countershaft (12, 12a), the inner input shaft (6) being connectable by a third shift element (S3) for rotation with the main shaft (26) which is part of the main group (4) for providing a direct transmission gear,
the range group (5) being connected at an input side thereof to the main shaft (26) and an output shaft (32) being connected to an output side of the range group (5), the range group (5) including a final shift element (S5) for locking the range group so as to provide a direct drive connection from the input shaft (8) to the output shaft (32) without interposition of meshing gear wheels into the power transmission path from the main input shaft (8) to the output shaft (32) which are arranged coaxially.

2. The load shift transmission as claimed in claim 1, wherein in at least one transmission gear (transmission gears 9, 18), the loose gear wheel (14), which can be rotationally fixedly connected by means of at least one shift element (S2) to the outer input shafts (7), and to an input constant (E2) is adapted to transmit power, which is supplied to the countershaft (12) from an outer input shaft (7), to the inner input shaft (6) which is rotationally fixedly by means of a shift element (S3) to the main shaft (26) of the main group (4).

3. The load shift transmission as claimed in claim 1, wherein groups of transmission gears (transmission gears 1 to 3; 4 to 8; 10 to 12; 13 to 17) can be power-shifted sequentially.

4. The load shift transmission as claimed in claim 1, wherein double up-shifts or double downshifts are possible without an interruption in traction force from individual transmission gears (transmission gears 1<==>3; 4<==>6; 7<==>9; 10<==>12; 13<==>15; 16<==>18).

5. The load shift transmission as claimed in claim 1, wherein multiple up-shifts or multiple downshifts are possible without an interruption in traction force from individual transmission gears (transmission gears 3<==>7; 4<==>7; 12<==>16; 13 <==>16).

6. The load-shift transmission as claimed in claim 1, wherein after a double or multiple up-shift, or double or multiple downshift, without an interruption in traction force (12<==>10), in the same transmission gear (transmission gear 10), a transfer is possible from one clutch (K2) of the double clutch (2), and the inner input shaft (6) which is connected thereto, to the other clutch (K1) of the dual clutch (2), and the outer input shaft (7) which is connected thereto.

7. The load shift transmission as claimed in claim 1, wherein, in the direct gear (transmission gear 16), the input constants (E1, E2, E3) are not drive-connected to the input shafts (6, 7).

8. The load shift transmission as claimed in claim 1, wherein at least one overdrive transmission gear (transmission gears 17, 18), is provided, and a shift process without an interruption in the traction force is possible from the direct gear (transmission gear 16) to the overdrive transmission gear or to the overdrive transmission gears (transmission gears 17, 18).

9. The load shift transmission as claimed in claim 1, wherein the split group (3) and the main group (4) have in each case three gearwheel planes (E1, E2, E3, H1, H2, H3), enabling nine partial transmission gears depending on the shift state of the split group (3) and of the main group (4).

10. The load shift transmission as claimed in claim 1, wherein the range group (5) is embodied as a planetary gear set (31) which, in one shift state (S5(2)), rotates as a block.

11. The load shift transmission as claimed in claim 3, wherein the uppermost group of sequentially power- or load-shiftable transmission gears comprises five transmission gears (transmission gears 13 to 17).

12. The load shift transmission as claimed in claim 1, wherein at least one non-synchronized shift element and a central synchronizing device are provided.

13. The load shift transmission as claimed in claim 12, wherein the central synchronizing device is a countershaft brake (33).

14. The load shift transmission as claimed in claim 1, wherein two parallel counter shafts (12, 12a), the power flow for various transmission gears.

15. The load shift transmission as claimed in claim 1, wherein all the shift elements (S1 to S5) are arranged coaxially along one transmission axis.

16. The load shift transmission as claimed in claim 15, wherein all the shift elements (S1 to S5), the input shafts (6, 7) and the drive output shaft (32) are arranged coaxially.

* * * * *